United States Patent [19]
Kirk

[11] 3,815,091
[45] June 4, 1974

[54] REMOTE DEVICE CONTROL COMMUNICATION SYSTEM
[75] Inventor: Robert T. Kirk, Ogden, Utah
[73] Assignee: Eaton Corporation, Cleveland, Ohio
[22] Filed: Feb. 21, 1973
[21] Appl. No.: 334,509

Related U.S. Application Data
[63] Continuation of Ser. No. 192,801, Oct. 27, 1971.

[52] U.S. Cl........ 340/147 R, 340/163 R, 340/147 P
[51] Int. Cl. ............................................. H03f 1/14
[58] Field of Search.......... 340/147 P, 163 R, 147 R

[56] References Cited
UNITED STATES PATENTS
3,566,355  2/1971  Smith............................. 340/147 R Primary Examiner—Harold I. Pitts
Attorney, Agent, or Firm—Lynn G. Foster

[57] ABSTRACT

A communication system for controlling remote devices, such as a plurality of vehicles. The system comprises a central control area including a computer for normally controlling a plurality of vehicles, a plurality of manual control stations each operable to provide direct or remote manual control of a selected one of said vehicles, and a plurality of peripheral stations each operable to provide temporary automatic control of a selected one of said vehicles. Means are provided for selecting a vehicle to be controlled, and means selectably places control of the selected vehicle under either said central control area or a responsive one of said stations.

2 Claims, 1 Drawing Figure

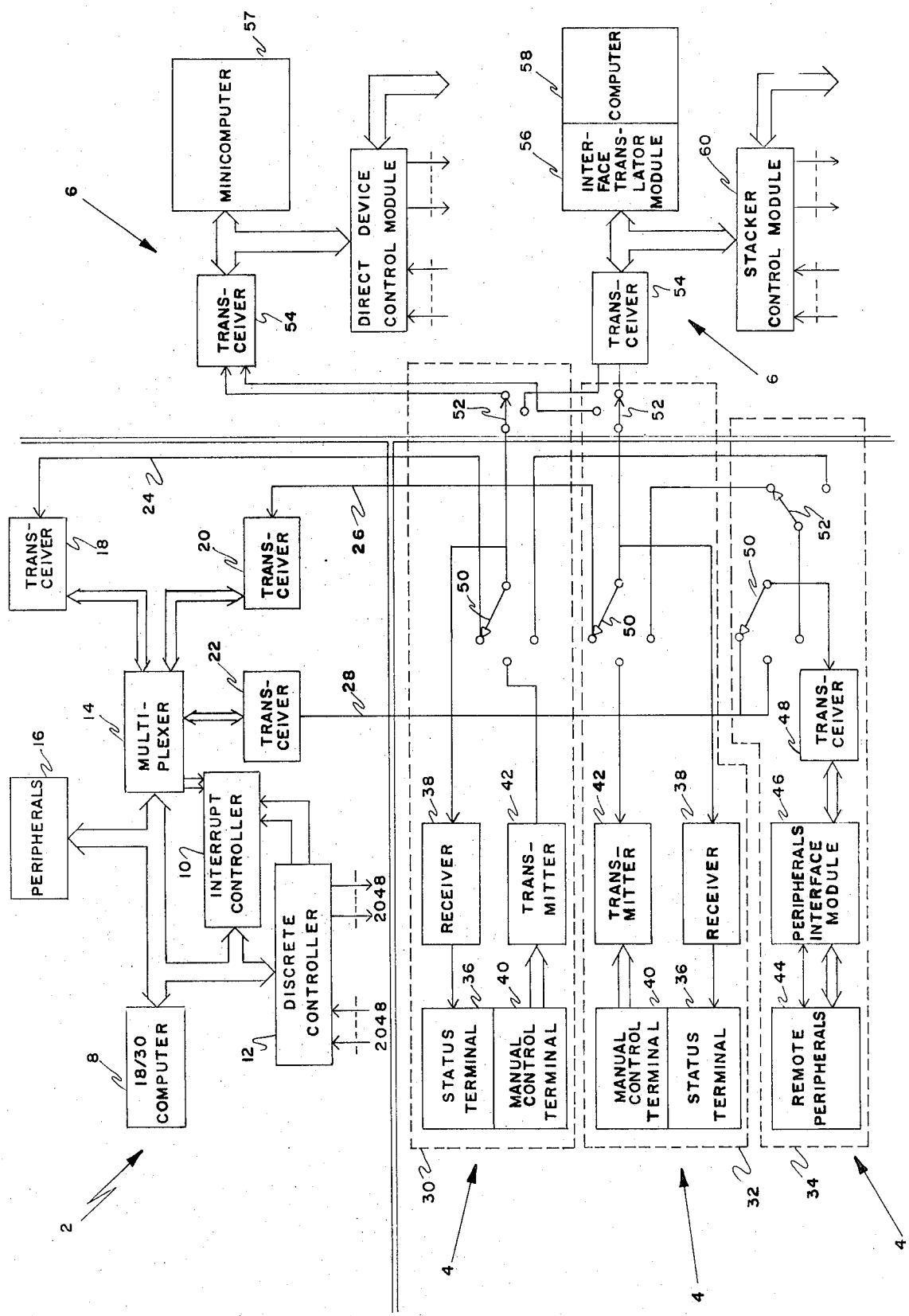

3,815,091

REMOTE DEVICE CONTROL COMMUNICATION SYSTEM

This is a continuation of application Ser. No. 192,801, filed Oct. 27, 1971.

BACKGROUND

1. Field of Invention

This invention relates to vehicle control systems and is particularly directed to a communication system for controlling a plurality of vehicles, such as stacker cranes.

2. Prior Art

In modern factory and warehouse operation, it is frequently necessary or desirable to be able to control the movements of a plurality of devices, such as machines or vehicles, automatically, as by means of a computer. Numerous methods and apparatus have been proposed heretofore for accomplishing such control. However, none of the prior art systems have been entirely satisfactory. It is customary to locate the controlling computer in a location remote from the devices or vehicles controlled thereby. However, it is frequently desirable to be able to control an individual device or vehicle independently of the computer control. To accommodate this, many of the prior art systems have provided for direct manual control of the devices or vehicles as an alternative to computer control. While such direct manual control is satisfactory for some purposes, it requires the presence of a human operator at the site of the device or on-board the vehicle, whereas it may be desired to manually control a remotely located device or vehicle or to cause a device or vehicle to carry out a temporary program independent of either a human operator or the central computer. No system has been proposed heretofore which could satisfy all of these requirements.

BRIEF SUMMARY AND OBJECTS OF THE INVENTION

These disadvantages of the prior art are overcome with the present invention and a control system is provided which permits a central computer to control a plurality of devices or vehicles in response to a variety of inputs, while providing for direct or remote manual control or temporary automatic control of a selected device or vehicle independent of the central computer.

The advantage of the present invention are preferably attained by providing a central computer which is connected to receive inputs from or provide outputs to a plurality of peripheral devices and serves to generate commands to individually control a plurality of vehicles, together with a plurality of manual control terminals connectable to directly or remotely control a selected device or vehicle, and a remote peripheral terminal connectable to temporarily control a selected device or vehicle in response to inputs from one or more remote peripheral devices.

Accordingly, it is an object of the present invention to provide an improved automatic control system.

Another object of the present invention is to provide a remote device control system which provides control by a central computer, while permitting direct or remote manual control of a selected device.

A further object of the present invention is to provide a remote device control system which provides control by a central computer, while permitting temporary automatic control in response to inputs from one or more remote peripheral devices.

A specific object of the present invention is to provide a control system comprising a central computer connected to receive inputs from a plurality of peripheral devices and serving to generate commands to individually control a plurality of devices or vehicles, together with a plurality of manual control terminals connectable to directly or remotely control a selected vehicle, and a remote peripheral terminal connectable to temporarily control a selected vehicle in response to inputs form one or more remote peripheral devices.

These and other objects and features of the present invention will be apparent from the following detailed description, taken with reference to the accompanying drawing.

BRIEF DESCRIPTION OF DRAWING

The FIGURE is a diagrammatic representation of a remote device control system embodying the present invention.

DETAILED DESCRIPTION OF ILLUSTRATED EMBODIMENT

In that form of the present invention chosen for purposes of illustration, the FIGURE shows a control system comprising a central control area indicated generally at 2, a plurality of remotely located control stations, indicated generally at 4, and a plurality of on-board units indicated generally at 6, each carried by a respective device or vehicle to be controlled. The central control area 2 includes a central computer 8, such as a model 1804 System 18/30 Processor, manufactured by General Automation, Inc., Santa Ana, California. The computer 8 serves to interface with an interrupt controller 10, a discrete controller 12, a multiplexer 14 and a plurality of peripheral devices, indicated generally at 16. The interrupt controller 10 interfaces with the computer 8, the discrete controller 12, and multiplexer 14 and serves to process interrupt requests. The discrete controller 12 receives discrete input signals from remote sensors and supplies discrete commands to remote control points. Preferably, the discrete controller 12 can handle up to 2,048 inputs and an equal number of outputs. The multiplexer 14 interfaces with as many as 256 transceivers, represented by blocks 18, 20 and 22. The transceivers 18, 20 and 22 each serve to convert parallel data, for computer 8, to serial data and to transmit this data to a respective one of the remote stations 4. In addition, the transceivers 18, 20 and 22 serve to receive serial data from the remote stations 4 and to convert this data to parallel form and store the data until it is removed by the computer 8. As shown, transceivers 18, 20 and 22 transmit and receive messages via communication lines 24, 26 and 28. However, it will be understood that, in practice, communication lines 24, 26 and 28 may be hard lines, telephone lines, slide wires, microwave or radio links, or other suitable communication means. The peripheral devices, represented by block 16, comprise magnetic tape transports, card punches, paper tape readers, paper tape punches, drum storage units, disc storage drives, line printers, teletype keyboards and printers, card readers, special purpose control and status panels and the like.

The remotely located control stations 4, may be manual control stations, as indicated at 30 and 32, for direct or remote manual control of the vehicles 6, or may be peripheral stations, represented by block 34, for temporary automatic control of the devices or vehicles 6. While only two manual control stations 30 and 32 and one peripheral station 34 have been illustrated, it should be understood that the number of such stations which may actually be provided is restricted only by the limitations of multiplexer 14 and computer 8. Each of the manual control stations 30 and 32 comprises a status terminal 36 which displays data received through receiver 38 from the central control area 2 and from a selected one of the controlled devices or vehicles 6. In addition, each of the manual control stations 30 and 32 comprises a manual control terminal 40 which can generate command messages for transmission by transmitter 42 to control the selected device or vehicle 6. Preferably, the manual control stations 30 and 32 are adapted to be employed either on-board or off-board the devices or vehicles 6 at the operator's option. Each of the peripheral stations 34 comprises one or more peripheral devices, represented by block 44, together with a peripheral interface module 46, where appropriate, and a transceiver 48 for transmitting and receiving signals between the peripheral device 44 and either the central control area 2 or a selected one of the devices or vehicles 6 to be controlled. The peripheral device 44 may be any control device located remotely from the central control area 2, such as a magnetic tape transport, card punch, paper tape reader, paper tape punch, drum storage unit, disc storage drive, line printer, teletype keyboard or printer, or card reader.

In addition to the foregoing items, each of the remotely located control stations 4 includes a mode switch 50 and a device selector switch 52. Device selector switch 52 serves to connect the respective remotely located control station 4 with a selected one of the devices or vehicles 6 to be controlled. The mode switch 50 is a three-position switch which is positionable to select one of three modes of operation, represented by contacts A, B and C of the mode switches 50. In the manual control stations 30 or 32, selection of contact A of the mode switch 50 places the selected one of the devices or vehicles 6 under the control of the central control area 2, but permits monitoring, at the associated one of the manual control stations 30 or 32, of the controlled operation by means of receiver 38 and status terminal 36. Selection of contact B of the mode switch 50 places the selected one of the devices or vehicles 6 under manual control of the manual control station 30 or 32, through manual control terminal 40 and transmitter 42. Again, receiver 38 and status terminal 36 permit monitoring of the controlled device or vehicle. The manual control accomplished, under this mode of operation, may be either direct or remote, depending upon whether the manual control station 30 or 32 is situated on-board or off-board of the controlled device or vehicle 6. Selection of contact C of the mode switch 50 connects the selected device or vehicle 6 for control by the remote peripheral station 34. At the remote peripheral station 34, selection of contacts A or B of the mode switch 50 connects the remote peripheral device 44 for communication with the central control area 2, while selection of contact C of mode switch 50 connects the remote peripheral device 44 to one of the manual control stations 30 or 32, as selected by vehicle selector switch 52 of the peripheral station 34, and, thence, to automatically control the selected one of the devices or vehicles 6. It should be understood that, although mode switches 50 and selector switches 52 have been shown as being physical devices, such switching could, if desired, be accomplished electronically by address designations in a message, or the like.

Each of the devices or vehicles 6 to be controlled carries on-board equipment comprising a transceiver 54, for receiving commands and transmitting status reports, together with means for carrying out the commands. As shown, where the controlled device is a vehicle, the latter means may comprise an interface translator module 56, a computer 58, such as an SPC-12 computer, manufactured by General Automation, Inc., and a vehicle control module 60. If desired, however, the interface translator modules 56 and computers 58 may be omitted, as described in the copending application of Arlyn G. Liddell, Ser. No. 200,290, filed Nov. 19, 1971, now abandoned, entitled "Off-Board Vehicle Control Unit" and assigned to the assignee of the present application. Alternatively, the means for carrying out commands may be a mini-computer 57 which, in turn, issues commands to a device control module 59 to control the operation of one or more devices, such as a machine tool.

In use, the devices or vehicles 6 will normally be controlled from the central control area 2 by means of computer 8 under a general program or in response to inputs to computer 8 received through discrete controller 12 or the peripheral devices 16. However, when desired, any of the devices or vehicles 6 can be controlled manually from one of the manual control stations 30 or 32 by selecting the desired device or vehicle 6 on device selector switch 52 and placing mode switch 50 in engagement with contact B. Alternatively, if desired, control of the desired device or vehicle can be accomplished automatically from a remote peripheral device 44 by positioning selector switch 50 of the peripheral station 34 to select the appropriate one of the manual control stations 30 or 32 and placing the mode switches 50 of the peripheral station 34 and the selected one of the manual control stations 30 or 32 to engage contact C.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:
1. A system comprising:
 a vehicular machine having related on-board signal-responsive control apparatus and status signal generating apparatus;
 a central control area including a computer and related data processing equipment;
 a manual control terminal located remotely from said central area;
 a status display terminal associated with and disposed in proximity with said manual control terminal;
 an on-board data transceiver disposed on said vehicular machine and connected in data communication relationship with said on-board signal responsive control apparatus, said on-board data transceiver receiving signals indicative of control commands for said vehicular machine and transmitting signals indicative of status reports for monitoring the controlled operation thereof;

a central data transceiver disposed at said central area and connected in data communication relationship with said central control area data processing equipment, said central data transceiver transmitting signals indicative of control commands for said vehicular machine generated by said central control area data processing equipment and receiving signals indicative of status reports for monitoring the controlled operation of said vehicular machine;

a data receiver for receiving signals indicative of status report for monitoring the controlled operation of said vehicular machine and connected to supply data signals to said status display terminal for visual display of said status reports;

a data transmitter connected to receive from said manual control terminal data signals indicative of control commands for said vehicular machine generated by said manual control terminal;

a data signal communication line interconnecting said on-board transceiver with said receiver; and switch means selectively operable to connect said data signal communication line in data signal communication with said central data transceiver or with said data transmitter, alternatively such that said system remotely controls said vehicular machine in response to signals either from said central control area or from said manual control terminal while providing, in either case, visual status reports on said status display terminal.

2. A system according to claim 1 additionally comprising:

additional data processing equipment disposed remotely from said central area and remotely from said manual control terminal and including a remote data signal transceiver connected in data communication relationship therewith, and wherein said switch means is selectively operable to connect said data signal communication line in data signal communication with said central data transceiver, said remote data transceiver, or said data transmitter, alternatively.

* * * * *